June 2, 1942. K. KISSLING 2,284,664
SHEARS
Filed Sept. 6, 1940 3 Sheets-Sheet 1
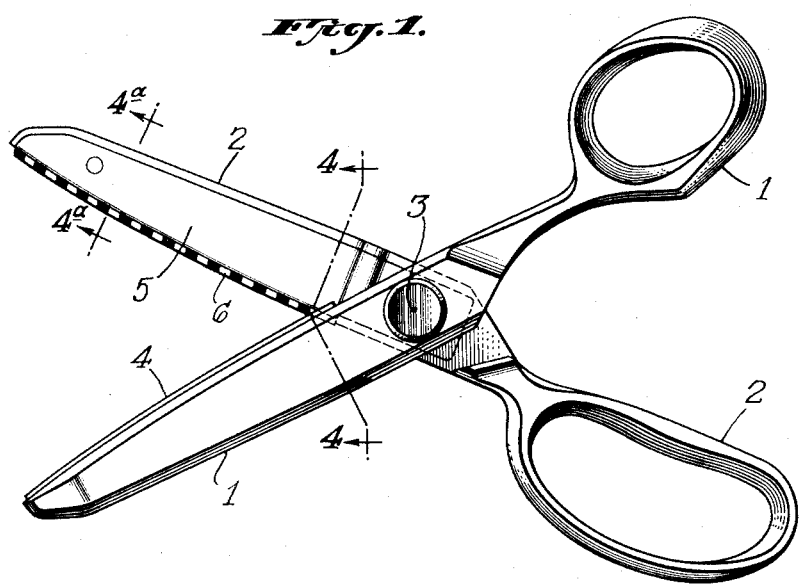
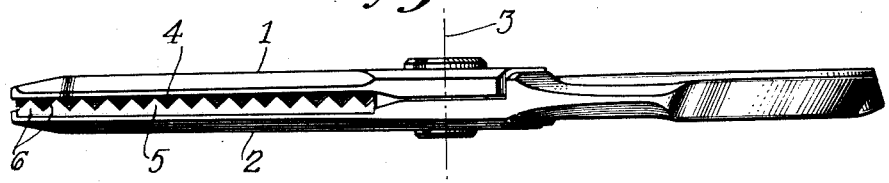
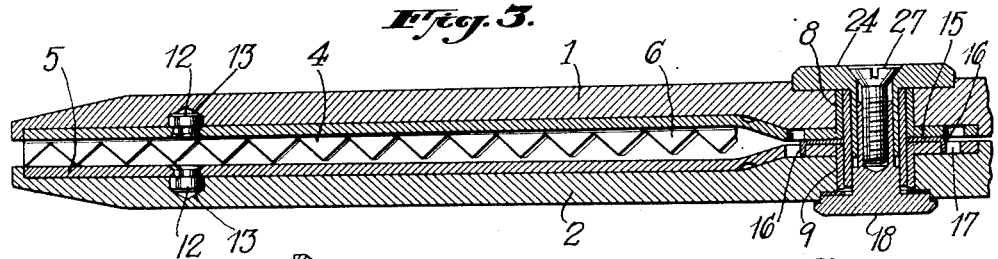
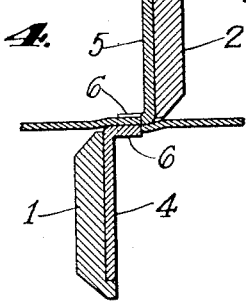 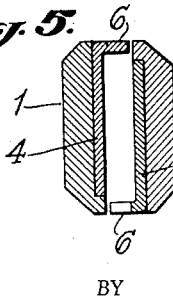 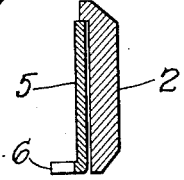
INVENTOR.
KURT KISSLING.
BY
his ATTORNEYS June 2, 1942.                K. KISSLING                2,284,664
                                SHEARS
                          Filed Sept. 6, 1940         3 Sheets-Sheet 2
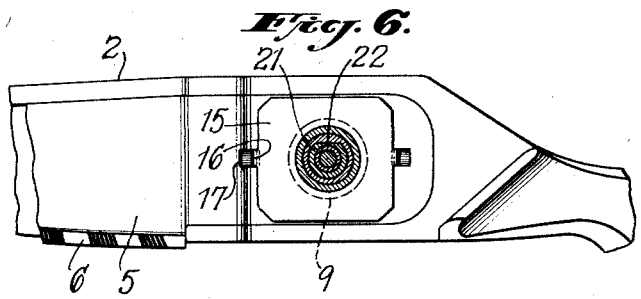
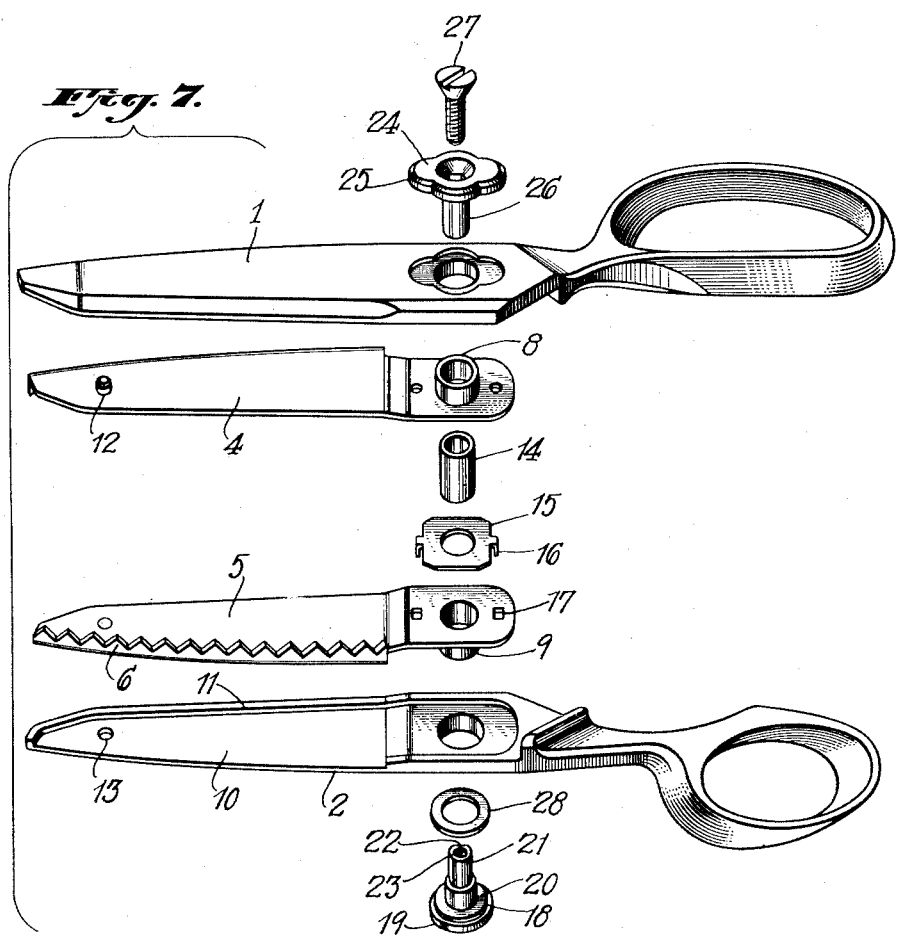
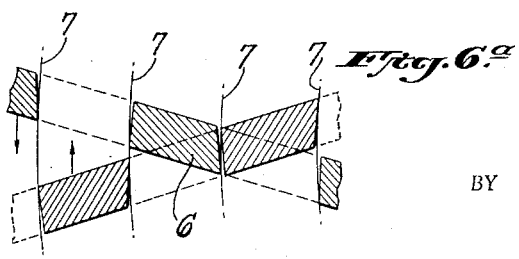
INVENTOR.
KURT KISSLING.
BY
his ATTORNEYS June 2, 1942.  K. KISSLING  2,284,664
SHEARS
Filed Sept. 6, 1940  3 Sheets-Sheet 3
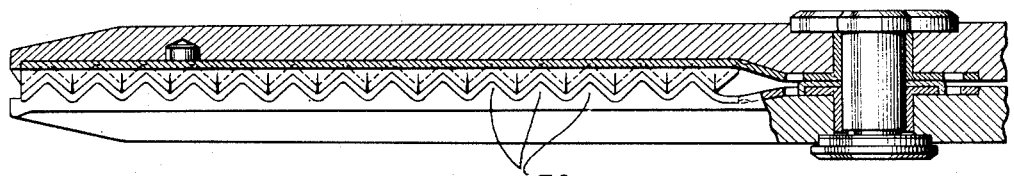
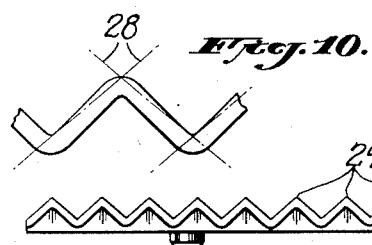
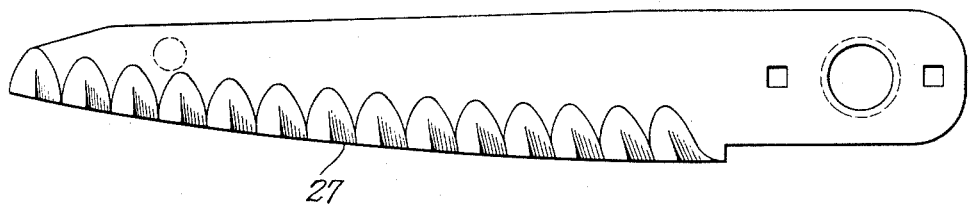
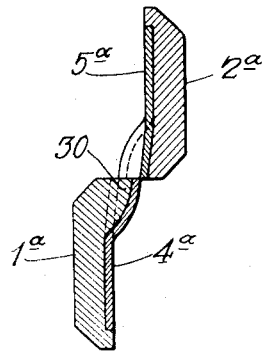
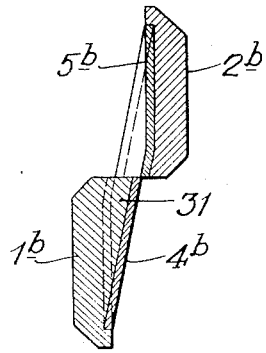
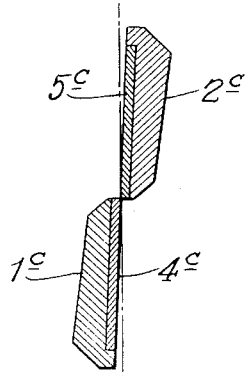
INVENTOR.
KURT KISSLING.
BY
ATTORNEYS Patented June 2, 1942

2,284,664

UNITED STATES PATENT OFFICE 2,284,664

SHEARS

Kurt Kissling, Glendale, N. Y.

Application September 6, 1940, Serial No. 355,562

13 Claims. (Cl. 30—260)

This invention relates to shears for cutting sheet material, and is useful in connection with pinking shears as well as smooth cutting shears.

An object of the invention is to provide shears which may be made in mass production at relatively low cost and at the same time presenting sharp and accurately formed cutting edges.

Another object is to provide shears whose cutting blades are readily removable for sharpening or replacement.

Another object is to provide shears of relatively light weight while providing cutting edges and bearing surfaces of relatively heavy dense long-wearing properties.

Further objects and advantages of the invention will more fully appear from the following description taken in connection with the accompanying drawings, which show by way of example the preferred embodiment of the invention.

The invention consists in the novel features, arrangements and combination of parts embodied by way of example in the apparatus hereinafter described as illustrating the present preferred form of the invention, and the invention will be more particularly pointed out in the appended claims.

In the drawings:

Fig. 1 is a plan view of one embodiment of the invention as applied to pinking shears with the shears in open position, Fig. 2 is a side elevation of the embodiment of Fig. 1 with the shears closed, Fig. 3 is a somewhat enlarged longitudinal section taken through a part of the shears of Figs. 1 and 2 and showing further structural details, Fig. 4 is a somewhat enlarged cross section taken at 4—4 of Fig. 1, Fig. 4a is a somewhat enlarged cross section taken at 4a—4a of Fig. 1, Fig. 5 is a section somewhat similar to Fig. 4 with the shears closed, Fig. 6 is a segmental enlarged plan view showing further details of the embodiment of Figs. 1-5, inclusive, Fig. 6a is an enlarged sectional view showing further details of the teeth formation and relationship, Fig. 7 is an exploded view of said embodiment, Fig. 8 is a partial sectional view similar to Fig. 3 but showing a modified form of pinking shears, Fig. 9 is a side elevation of one of the removable blades of Fig. 8, Fig. 10 is a segmental enlarged detail of the teeth formation of Fig. 9, Fig. 11 is a side elevation of the blade of Fig. 9, Fig. 12 is a cross section through the modified structure of Fig. 8, with the shears in cutting engagement, Fig. 13 is a view similar to Fig. 12 illustrating a modified structure, and Fig. 14 is a cross section of an embodiment of the invention as applied to regular smooth blade shears.

The invention is applicable to pinking shears and regular smooth blade shears. Therefore, embodiments will be illustrated and described as to both types, but since the structure of pinking shears is somewhat more difficult to understand, this type has, for this reason, been more profusely illustrated and the invention more especially described relative thereto. It will be understood by those skilled in the art that the generic features of the invention are equally well adapted to both types of shears.

In the invention separate frame members and blade members are provided. The frame members are preferably, though not necessarily, made of material which can be molded, die cast or otherwise formed in mass production more economically than would be the case if the blades were integral therewith. For instance, the frames of the present embodiment are made of aluminum, and I have also made frames of resinous plastic material. The blades are made of relatively thin steel suitable for cutting edges and are adapted to be stamped out in mass production, after which the desired cutting edge is formed thereon. The blades are preferably provided with suitable bearing surfaces to relieve the frames of bearing wear and avoid the necessity of providing close tolerances in the frame members; and a special pivotal bearing assembly is provided as ancillary. In the pinking shear embodiments each blade body and the respectively cooperating inner faces of the frame members are offset throughout the length of the cutting edges so as to provide for the inwardly extending pinking teeth which project in respectively opposite directions and engage in interfitting relationship. In the plain or smooth shear embodiment the blades need not be thus offset, and accordingly are shown with the cutting edges formed on the edge of the blade lying in the plane of the blade body.

Referring more particularly to Figs. 1-5, inclusive: frame members 1 and 2, each comprising a jaw portion and a handle portion, are pivotally secured together about the pivot axis 3 and serve to carry the respectively cooperating removable blade members 4 and 5 which are supported and held in operative relation in the manner to be more particularly described following. Each of the blades 4 and 5 is made of thin resilient steel or like material suitable for providing a cutting edge. In the embodiment shown in Figs. 1-7, inclusive, the invention is shown as applicable to pinking shears and the pinking teeth are provided on an inwardly turned flange of the blades 4 and 5. The teeth, designated in general as 6, may be formed roughly by a blanking die, at the time that the blanks are stamped out, or by a second operation, and then after forming the teeth, a portion of the formed teeth removed by grinding to provide the tooth cutting surface; or if desired, the teeth may be entirely formed by grinding. A longitudinal section through the teeth in cooperative relationship is shown in enlarged segmental section in Fig. 6a, from which it will be seen that the relationship of the sets of teeth is concentric. Due to the thinness of the cutting edge provided on the blades, the teeth may be ground tangential to the concentric arcs such as 7 (which are inscribed about the axis 3), but are preferably formed as indicated on Fig. 6a, where the cutting surfaces of the teeth are along a straight line formed at a slight receding angle from a tangent to the arcs 7. The body of each of the blades 4 and 5 is offset outwardly adjacent the termination of the cutting edge formed by the teeth 6 to provide for the inwardly disposed intermeshing engagement of the teeth along the center line of the shears lying in a plane perpendicular to the axis 3; so as to bring the teeth in the relationship clearly indicated in Fig. 3. The inner ends of the blades are provided with bearing sleeves 8 and 9 (Fig. 7) which are rigidly attached to and extend outwardly from the blades and whose outer diameters are inserted in respectively cooperating bores in the frame members 1 and 2. The frame members are recessed on their respectively inner faces so that each is provided with a recess such as 10 with an outer marginal flange such as 11; and the blades each rest within their respective recesses with the outer edge of the blades against the closely fitting flange 11 which serves to back them up. The blades are each provided with dowel pins or rivets such as 12 which are positioned freely in cooperating dowel holes such as 13 formed in respectively cooperating frame members and permitting movement of the blades relative to their respective frames in a direction parallel to the axis 3 from the blade tips toward the axis 3. The blades 4 and 5 are positioned with their body portions lying within the recesses 10 in the respective frame members 1 and 2, and with the bushings 8 and 9 positioned within the cooperating bores in the members 1 and 2, at which time the dowels such as 12 will fall within the dowel holes such as 13. An internal bushing 14 is then inserted through the bushings 8 and 9 with a lock washer 15 interposed between the inner faces of the blades 4 and 5, the washer being provided with detents such as 16 engaging in registering holes such as 17 formed in the blade member 4. The parts are held in assembled condition by means of the composite journal stud comprising the part 18 provided with a circular head 19, a cylindrical journal stem segment 20 whose outer diameter fits within the bore of the bushing 14 and with a reduced portion 21 provided with a flattened portion 22 extending from the enlarged portion 20 to the upper end of the reduced portion and drilled and tapped for screw thread engagement as at 23. A cooperating member 24 is provided with a non-circular head 25 and with a stem 26 having an upwardly extending internal bore so formed as to telescopically engage the reduced portion 21 of the member 19 and to be held non-rotatively therewith by means of a flat portion (not shown) in cooperative engagement with the flat portion 23 of the member 19. The head 24 is countersunk for receiving the head of a locking screw 27 which is adapted to pass through the head 24 and to be received on the threaded bore 23 of the member 19. A circular washer 28 is preferably disposed between the head 18 of the member 19 and the frame member 2. With the parts thus disposed, the shears are shown in assembled relation in Fig. 3, from which it will be noted that the non-circular member is seated in a non-circular co-operating recess formed in the frame member 1, and the circular head 18 is seated in its cooperating circular recess formed in the shear member 2. With the shears in the position indicated in Fig. 1, the parts are so disposed that the blades at their outer ends are preferably slightly spaced from the respective frame members as indicated in Fig. 4a, so that as the shears are closed there is a floating action of the blades with respect to their frame members tending to facilitate the proper alignment and cutting engagement of the cooperating cutting surfaces, while at the same time leaving the blades free from extraneous strains which might be imposed on the frame members by the operator in manipulating the shears.

The relative positions of the shear jaws and blades are illustrated in Figs. 4, 4a and 5, from which it will be seen that the cutting jaws, due to their small cross section or thickness, can be made of very high grade tool alloy steel which will impart a much keener edge and at the same time prolong the life of the shears. Furthermore, from the manufacturing standpoint due to the relatively small amount of the high grade steel required, shears having very accurately formed high grade steel cutting edges can be provided at relatively low cost since with my invention the frame members may be made of relatively cheaper material. An added advantage is provided in my invention in the ability to make much lighter shears than heretofore possible, since with this design the shear members may be made of light material such as stamped or pressed aluminum, formed or molded plastics or laminated fabric impregnated with plastics or the like suitable material. This is possible because the frame members have been relieved from bearing journals and in view of the floating support of the blade members which insures accurate floating alignment of the cutting edges even if the frame members are not made with the degree of accuracy necessary in the usual shears.

It will be understood in this connection that the blades themselves are ground in suitable jigs so that they will have the proper relationship to their journal sleeves 8 and 9 in shearing movement, so that when they are placed in assembled position with the respective frame members they will be assured accurate cutting engagement.

In Figs. 8-12, inclusive, I have shown a modification of pinking shears in so far as the blade cutting edge is concerned, otherwise the structure and arrangement of the parts are identical with that heretofore described with the exception to be hereinafter pointed out, and need not be repeated. In this modification instead of providing the teeth on an inwardly directed flange the blank is provided with corrugations whose upper edge when ground along the line 27 (Fig. 11) corresponds in contour substantially with the tooth formation desired. These corrugations extend downwardly to a limited extent as indicated in Figs. 11 and 12. After forming the teeth, a portion of the formed tooth is removed by grinding to provide a tooth cutting surface; the ground portions being indicated by the dot and dash lines such as 28 (Fig. 10); and the finished teeth being shown in plan view in Fig. 9 and being designated 29. The frame members are preferably provided with ridged portions corresponding to the rear side of the corrugated tooth portions of the blades, as indicated at 30 (Fig. 8) in order to provide a smooth finished-looking structure; and said ridged portions additionally serve as a supplemental reinforcement. However, the structure is such as not to necessitate these ridged portions on the frame members.

Fig. 12 illustrates a cross section through the shears provided with the corrugated tooth structure above described and corresponds in general to section 4 of the previous embodiment with the shears in the position indicated in Fig. 1; the frame members of Fig. 12 being designated Ia and 2a and the respectively corresponding blade members as 4a and 5a and one of the ridged portions interfitting in the rear side of the corrugations is indicated as 30.

Fig. 13 shows a modified structure employing a similar corrugation but in which the corrugations extend substantially throughout the width of the blades. In both the corrugated embodiments it is understood that the ground surfaces need only be along the upper edge of the corrugations and downwardly therefrom for a limited extent only, the corrugations tapering inwardly and downwardly to provide the desired clearance; the frame and blade members in Fig. 13 being designated respectively as 1b—2b and 4b—5b, and one of the ridges cooperating with the back of the teeth being designated as 31.

In Fig. 14 I have illustrated a section corresponding to that of Figs. 4, 12 and 13 but taken through a pair of shears provided with a regular or smooth cutting edge and in which shears the frame members are designated 1c—2c and the respectively corresponding blade members as 4c—5c. Complete details of these smooth edge shears are not deemed necessary since they are structurally identical with those previously described with the exception that the cutting edges are formed directly on the respectively inner edges of the body portion of the blades 4c and 5c and the blades are not offset as in the previous structures, and hence the frame members are not offset on their inner faces where recessed for the blades 4c and 5c. In this embodiment clearance may be provided as is customary in usual plain shears by toeing in the frame slightly or, in view of the floating blade construction, the blades may be slightly twisted to provide the necesssary clearance; all of which will be more fully understood by those skilled in the art after understanding the foregoing description.

It will be understood from the foregoing that with my invention the cutting blades may be easily removed for sharpening or may be readily replaced by a new pair of blades by the user himself without any necessity for returning the shears to the manufacturer or to a professional grinder. This is especially true with the pinking shears, where such shears are relatively costly and the accurate meshing of the cutting teeth is necessary for proper operation.

Having thus described my invention with particularity with reference to the preferred embodiment of the same, and having referred to some of the possible modifications thereof, it will be obvious to those skilled in the art, after understanding my invention, that other changes and modifications may be made therein without departing from the spirit and scope of the invention, and I aim in the appended claims to cover such changes and modifications as are within the scope of the invention.

What I claim is:

1. A pair of shears comprising, a pair of frame members, a pair of cutting blades provided with cooperating cutting edges, said blades being positioned along the inner adjacent faces of respective of said frame members and being respectively carried on and movable with said members in the direction of shearing movement, said members and said blades being so constructed and arranged that said blades are substantially rigidly held on respective frame members and movable therewith in the direction of shearing movement while freely floatingly supported for movement independently of said members in a direction transverse to said direction of shearing movement throughout a major portion of their cutting edges.

2. A pair of shears comprising, a pair of frame members, means for pivotally securing said frame members together, a pair of cutting blades provided with cooperating cutting edges and removably secured between said frame members, and cooperating means provided jointly by said members and said blades so constructed and arranged as to hold said blades upon respective of said members fixed against movement relative thereto in a direction of shearing movement while permitting movement relative thereto in a direction transverse to the direction of shearing movement.

3. A pair of shears comprising, a pair of frame members each comprising jaw and handle portions, means for pivotally securing said frame members together intermediate said jaw and handle portions, a pair of cutting blades provided with cooperating cutting edges and removably secured between said frame members, said blades extending substantially throughout the longitudinal extent of said jaws and having their inner ends securely held in position between said members adjacent said pivotal connection and their outer ends restrained against movement in the direction of shearing movement while free for limited lateral movement in a direction parallel to the pivot axis relative to respective frame members, said blades being relatively flexible in a direction of movement parallel to the pivot axis and relatively rigid in the direction of shearing movement, whereby the contact between the cutting edges during shearing operation are permitted relative floating movement in a direction transverse the shearing movement independently of the respective frame members.

4. A pair of shears comprising, a pair of frame members each comprising jaw and handle portions, pivot means for securing said members together, a pair of flexible removable cutting blades provided with cooperating cutting edges and each having a portion surrounding said pivot means and a relatively thin body portion lying in face to face juxtaposition with the inner face of the respective frame jaw, said jaws and blades being so constructed and arranged that the blades are held against respective jaws rigidly as to relative movement in a direction of shearing movement and flexibly as to relative movement in a direction transverse shearing movement, whereby the cutting edges are floatingly supported independently of their frame members.

5. A pair of shears comprising, a pair of frame members each comprising jaw and handle portions, a pair of thin relatively resilient removable cutting blades carried by and lying contiguous the inner faces of respective of said members, said blades being provided with cooperating oppositely disposed cutting edges positioned adjacent the corresponding upper and lower edges of said jaws, and pivot means operatively connecting said members and blades, said blades and frame members being so constructed and arranged that said blades are rigidly held against respective of said frame members when moved thereby in the direction of shear movement and are freely held for limited movement in a transverse direction.

6. A pair of pinking shears comprising, a pair of frame members each comprising jaw and handle portions, a pair of thin relatively resilient removable cutting blades carried by and recessed in the inner faces of respective of said members, said blades being provided with cooperating oppositely disposed pinking teeth positioned adjacent the corresponding upper and lower edges of said jaws and extending inwardly thereof, and pivot means operatively connecting said members and blades, said blades and frame members being so constructed and arranged that said blades are rigidly held against respective of said frame members when moved thereby in the direction of shear movement and are freely held for limited movement in a transverse direction.

7. A pair of shears comprising, a pair of frame members each comprising jaw and handle portions, a pair of thin relatively resilient removable cutting blades carried by and lying contiguous the inner faces of respective of said members, said blades being provided along their marginal edges adjacent the corresponding upper and lower edges of said jaws with cooperatingly disposed inwardly extending corrugations staggered in intermeshing relationship, said corrugated edges and the inner faces of contiguous portions of said corrugations serving as pinking teeth, and pivot means operatively connecting said frame members and said blades.

8. A pair of shears comprising, a pair of frame members each comprising jaw and handle portions, a pair of thin relatively resilient removable cutting blades carried by and recessed in the inner faces of respective of said members, said blades being provided along their marginal edges adjacent the corresponding upper and lower edges of said jaws with cooperatingly disposed inwardly extending corrugations staggered in intermeshing relationship, said corrugated edges and the inner faces of contiguous portions of said corrugations serving as pinking teeth, said recessed faces of said frame members being provided with a ridged surface corresponding to and adapted to interfit with the outer surfaces of the corrugated portions of respective of said blades, and pivot means operatively connecting said frame members and said blades.

9. A pair of pinking shears comprising, a pair of frame members each comprising jaw and handle portions, a pair of relatively thin cutting blades carried by respective of said members, said blades having main body portions lying substantially parallel to a plane normal to the shear axis and provided with cooperating oppositely disposed intermeshing pinking teeth positioned adjacent the corresponding inner edges of said jaws and extending inwardly thereof, and pivot means intermediate said jaw and handle portions operatively connecting said members and blades, said blades being offset outwardly so as to bring said intermeshing teeth substantially centrally disposed relative to said plane normal to the shear axis.

10. A pair of shears comprising, a pair of frame members each comprising jaw and handle portions, a pair of removable cutting blades carried by and lying contiguous the inner faces of respective of said members, said blades being provided with cooperating cutting edges positioned adjacent the inner edges of respective of said jaws, and pivot means operatively connecting said members and blades, said pivot means comprising journal sleeves formed integral with said blades and positioned in bores in said frame members.

11. A pair of shears comprising, a pair of frame members each comprising jaw and handle portions, a pair of removable cutting blades carried by and lying contiguous the inner faces of respective of said members, said blades being provided with cooperating cutting edges positioned adjacent the inner edges of respective of said jaws, and pivot means operatively connecting said members and blades, said pivot means comprising journal sleeves formed integral with said blades and positioned in bores in said frame members, and a separate journal bushing passing through said journal sleeves and screw means for holding said parts together axially of the shear axis.

12. A pair of shears comprising, a pair of frame members each comprising jaw and handle portions, a pair of removable cutting blades carried by and lying contiguous the inner faces of respective of said members, said blades being provided with cooperating cutting edges positioned adjacent the inner edges of respective of said jaws and journal sleeves formed integral with respective of said blades and positioned in aligned bores in respective of said frame members, and pivot means operatively connecting said members and blades, said pivot means comprising axially separable outer and inner parts telescopingly engaging each other in axial sliding and non-rotatable relationship and a bushing surrounding said telescoping parts and serving as a pivot journal for one of said blade sleeves and as a centering journal for the other of said blade sleeves, one of said parts having a head rotatably positioned relative to the respectively adjacent frame member and the other of said parts having a head non-rotatably positioned relative to the other frame member and a screw means in cooperative engagement with the inner and outer parts serving to hold said parts in axial cooperative position.

13. A pair of shears comprising, a pair of frame members each comprising jaw and handle portions, a pair of removable cutting blades carried by and lying contiguous the inner faces of respective of said members, said blades being provided with cooperating cutting edges positioned adjacent the inner edges of respective of said jaws, and pivot means operatively connecting said members and blades, said pivot means comprising journal sleeves formed integral with said blades and positioned in bores in said frame members, a separate journal bushing passing through said journal sleeves, an outer pin journaled in said bushing, an inner pin telescopically engaged within said outer pin in axial sliding and non-rotatable relationship and screw means for holding said inner and outer pins in axially adjusted position, one of said pins having a head rotatably positioned relative to the respectively adjacent frame member and the other of said pins having a head non-rotatably positioned relative to the other frame member.

KURT KISSLING.